UNITED STATES PATENT OFFICE.

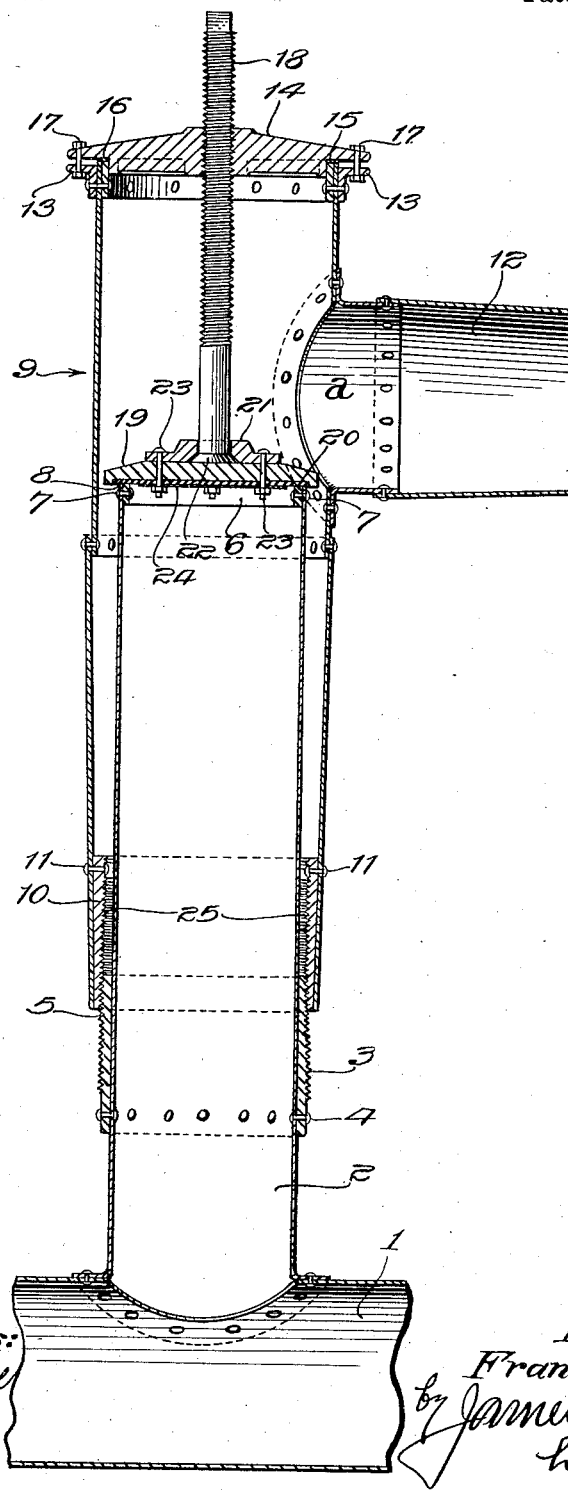

FRANK HUDSON, OF DOLGEVILLE, CALIFORNIA.

SWIVELED IRRIGATING-HYDRANT FOR SHEET-METAL PIPES.

1,077,936.  Specification of Letters Patent.  Patented Nov. 4, 1913.

Application filed April 14, 1909. Serial No. 489,954.

*To all whom it may concern:*

Be it known that I, FRANK HUDSON, a citizen of the United States, residing at Dolgeville, in the county of Los Angeles and State of California, have invented a new and useful Swiveled Irrigating-Hydrant for Sheet-Metal Pipes, of which the following is a specification.

An object of the invention is to provide for sheet metal pipes a hydrant having a cheap, simple and easily installed non-leaking swivel head which may readily be turned to deliver water in any direction, and the invention consists of the novel features herein shown, described and claimed.

The hydrant may be applied to pipe lines of vitrified and other kinds of pipe as well as to sheet metal pipe lines, and may be connected therewith as a T or an L. In the accompanying drawing the T connection is shown as applied with sheet metal pipe.

The figure is a vertical central section of a hydrant and illustrates the invention.

The irrigating pipe-line 1 is constructed of sheet metal and the stand-pipe 2 extends upwardly from the pipe-line, said stand-pipe being constructed in connection with a section of the pipe-line as a T; the stand-pipe also being of sheet metal. The exterior-screw-threaded nipple 3 is mounted tightly upon the stand-pipe 2 near its mid-length and secured rigidly in place by rivets 4, said nipple having the exterior screw-threads 5. A strap-iron ring 6 is inserted in the upper end of the stand-pipe 2 and secured by rivets 7, and then the upper ends of the stand-pipe and ring are squared and finished to produce the valve-seat 8.

The swiveled hydrant-head is mounted upon the stand-pipe 2 and comprises the sheet-metal cylinder 9 and having a lateral outlet *a*, the interiorly screw-threaded coupling member 10 in the form of a sleeve mounted in the lower end of the cylinder and secured by rivets 11 and screw-seated upon the threads 5; the discharge nozzle 12 extending laterally from the cylinder 9 in the form of a T, the angle-iron ring 13 mounted upon the cylinder 9 near its upper end; means in the form of a cap 14 for closing the upper end of the cylinder; the gasket-seat 15 in the cap; the gasket 16 in the gasket-seat and fitting against the upper end of the cylinder 9, and the bolts 17 securing the cap 14 removably to the angle-iron ring 13. The exteriorly screw-threaded valve-stem 18 is mounted vertically through the center of the cap 14, that is threaded to receive it, the upper end of the valve-stem being squared or otherwise fitted to receive a wrench for operation.

The valve-plate 19 is large enough to work in opposition to the seat 8 to close communication between the pipe and the outlet, there being a rubber gasket 20 against the lower face of the valve-plate to fit upon the seat 8. The lower end of the valve-stem 18 is passed through the attaching-plate 21 and then headed to prevent withdrawal from the attaching-plate, as indicated by head 22, and then the attaching-plate 21 is secured to the valve-plate 19 by rivets 23, thereby forming a swiveled universal joint between the valve-stem and the valve-plate.

A sheet-iron disk 24 is placed under the rubber gasket 20 and the bolts 23 pass through the disk 24 so as to hold the gasket in place.

The nipple 3 may be a close fit upon the stand-pipe and it may be calked with paint, or solder, and the coupling member 10 may be fitted closely in the cylinder 9 and calked with paint or solder, or fitted in any suitable way to make a reasonably tight joint and the internal threads 25 of the coupling member 10 and the external threads 5 of the nipple may be a pipe-joint fit so as to make a tight joint.

By means of this construction the hydrant head has a swiveled connection with the irrigating pipe and may be rotated thereon to direct the discharge nozzle 10 toward any point of the compass, this constituting my newly invented swiveled irrigating hydrant for sheet metal pipes. By the use of the sheet metal construction shown it is possible to greatly reduce the weight of the hydrant as compared with any hydrant heretofore known.

It is obvious that the head may be turned backwardly from a tight position to discharge water in any desired direction. When the valve-stem 18 is operated to press the gasket 20 against the seat 8 the water-pressure is held within the main stand-pipe and there is no water-pressure in the hydrant-head, and when the valve-stem 18 is operated to open the valve-mechanism the outlet 12 is sufficient to carry the entire supply of water and there is very little if any pressure in the hydrant-head.

I claim:

1. In a swiveled irrigating hydrant for sheet-metal pipes, a sheet-metal stand-pipe, an exteriorly screw-threaded nipple upon the stand-pipe intermediate of its ends, a valve-seat upon the upper end of the stand-pipe, a cylinder of sheet-metal, an interiorly screw-threaded coupling member secured to the cylinder and screw-seated upon the nipple, a head for closing the cylinder, a valve-stem mounted through the head, and a valve carried by the valve-stem to engage the valve-seat and control the flow of water.

2. A hydrant comprising a sheet-metal pipe an externally threaded nipple fixed thereon, a sheet-metal cylinder provided on one side with an outlet, means to close one end of the cylinder, an internally threaded sleeve fixed in the cylinder and screwed on the nipple, and a valve carried by the cylinder and adapted to close communication between the pipe and the outlet.

In testimony whereof, I have hereunto set my hand at Los Angeles, California, this 26th day of September, 1908.

FRANK HUDSON.

In presence of—
 JAMES R. TOWNSEND,
 M. BEULAH TOWNSEND.

---

Copies of this patent may be obtained for five cents each, by addressing the "Commissioner of Patents, Washington, D. C."